US011558906B2

(12) United States Patent
Staats et al.

(10) Patent No.: US 11,558,906 B2
(45) Date of Patent: Jan. 17, 2023

(54) OPERATOR AUTHENTICATION WITH A VEHICLE USING DIFFERENT PATHWAYS

(71) Applicant: Westinghouse Air Brake Technologies Corporation, Wilmerding, PA (US)

(72) Inventors: Andrew Staats, Cedar Rapids, IA (US); Stuart Barr, Cedar Rapids, IA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 393 days.

(21) Appl. No.: 16/802,286

(22) Filed: Feb. 26, 2020

(65) Prior Publication Data

US 2021/0266988 A1 Aug. 26, 2021

(51) Int. Cl.
| *G06F 21/00* | (2013.01) |
| *H04L 29/06* | (2006.01) |
| *H04W 76/10* | (2018.01) |
| *H04W 12/04* | (2021.01) |
| *H04W 12/033* | (2021.01) |

(52) U.S. Cl.
CPC ......... *H04W 76/10* (2018.02); *H04W 12/033* (2021.01); *H04W 12/04* (2013.01)

(58) Field of Classification Search
CPC .... H04W 76/10; H04W 12/033; H04W 12/04
USPC .......................................................... 726/6
See application file for complete search history.

(56) References Cited

U.S. PATENT DOCUMENTS

| 8,111,617 | B2* | 2/2012 | Karaoguz | H04L 69/40 370/228 |
| 10,891,815 | B2* | 1/2021 | Endo | B60R 25/24 |
| 2012/0303237 | A1* | 11/2012 | Kumar | B61D 17/12 701/99 |
| 2013/0024060 | A1* | 1/2013 | Sukkarie | H04L 67/12 701/22 |
| 2015/0189587 | A1* | 7/2015 | Bennett | H04W 52/0203 455/552.1 |
| 2017/0272418 | A1* | 9/2017 | Kim | H04L 63/08 |
| 2018/0012433 | A1* | 1/2018 | Ricci | A61B 5/1176 |
| 2020/0094779 | A1* | 3/2020 | Hiruta | G07C 5/085 |
| 2020/0143324 | A1* | 5/2020 | Takebayashi | B60R 25/20 |
| 2020/0160707 | A1* | 5/2020 | Yasui | G06Q 50/10 |
| 2020/0356651 | A1* | 11/2020 | Yen | G06F 21/35 |

FOREIGN PATENT DOCUMENTS

| CN | 109544985 A | * | 3/2019 | ............ B61L 23/041 |
| DE | 102011006772 A1 | * | 10/2012 | ............ B61L 15/0027 |
| WO | WO-2020083822 A1 | * | 4/2020 | ............ G06F 12/1408 |

* cited by examiner

*Primary Examiner* — Haresh N Patel
(74) *Attorney, Agent, or Firm* — The Small Patent Law Group LLC; Christopher R. Carroll (57) ABSTRACT

In accordance with one or more embodiments described herein, a method is provided. The method includes receiving a request to assume control of a vehicle generated by a candidate operator via a first communication pathway. The method obtains a key from an onboard controller of the vehicle and communicates the key to the candidate operator via a second communication pathway that is different from the first communication pathway. The method determines the candidate operator to be a confirmed operator based at least in part on obtaining the key from the candidate operator via the first communication pathway.

17 Claims, 6 Drawing Sheets

OPERATOR AUTHENTICATION WITH A VEHICLE USING DIFFERENT PATHWAYS

BACKGROUND

Technical Field

The subject matter described herein relates to methods and systems for operator authentication in a vehicle network.

Discussion of Art

Vehicles in a vehicle network can operate according to safety systems configured to manage access to control of the vehicles. These systems may seek to prevent unauthorized movement of the vehicles and/or ensure that only certain operators have access to certain vehicles and/or at certain times. These systems may rely on databases that associate different authorized operators of the vehicles with different permissions related to control of the vehicle. Conventional systems for authenticating operators of vehicles can include the operator inputting a unique identification and password assigned to the operator into an onboard controller of a vehicle. Separately, the operator can communicate with a back office or dispatcher associated with a vehicle network to confirm control of the vehicle. However, conventional systems for authenticating operators on vehicles associated with vehicle networks fail to provide adequate controls to prevent unauthorized operators from operating vehicles. For example, such systems do not implement controls for refusing to proceed with commands to move the vehicles based on unauthorized or falsely obtained access to onboard controllers of vehicles. Furthermore, conventional systems do not adequately address potential problems of offboard operators controlling vehicles outside of permissions and/or schedules associated with the vehicles. Unauthorized or conflicting control of vehicles on vehicle networks can pose significant safety and security risks.

BRIEF DESCRIPTION

In accordance with one or more embodiments described herein, a method is provided. The method includes receiving a request to assume control of a vehicle generated by a candidate operator via a first communication pathway. The method obtains a key from an onboard controller of the vehicle and communicates the key to the candidate operator via a second communication pathway that is different from the first communication pathway. The method determines the candidate operator to be a confirmed operator based at least in part on obtaining the key from the candidate operator via the first communication pathway.

In accordance with one or more embodiments described herein, a system is provided. The system includes an offboard controller for communicating with one or more vehicles on a vehicle network and one or more processors configured to be coupled to one or more of the offboard controller. The one or more processors are configured to receive a request to assume control of a vehicle generated by a candidate operator via a first communication pathway, obtain a key from an onboard controller of the vehicle, communicate the key to the candidate operator via a second communication pathway that is different from the first communication pathway, and determine the candidate operator to be a confirmed operator based at least in part on obtaining the key from the candidate operator via the first communication pathway.

In accordance with one or more embodiments described herein, a system is provided. The system includes an onboard controller configured to be disposed onboard a vehicle located within a vehicle network. The onboard controller is configured to receive a request for a key, generate the key, communicate the key to an offboard controller associated with the vehicle network, and determining the candidate operator to be a confirmed operator based at least in part on obtaining a confirmation signal from the offboard controller indicating the candidate operator to be the confirmed operator prior to opening a secure communication channel with the candidate operator.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein provide for systems and methods that are configured to authenticate operators for vehicles associated with one or more vehicle networks. One or more offboard controllers associated with a vehicle network can be configured to receive requests to assume control of one or more vehicles generated by candidate operators over a first communication pathway. The one or more offboard controllers can, based on receiving a request, be configured to obtain a key from an onboard controller of one or more vehicles and communicate the key to the candidate controller over a second communication pathway that is different from the first communication pathway. The candidate controller, upon receiving the key over the second communication pathway, can communicate the key back to the one or more offboard controllers via the first communication pathway. Upon receiving the replayed and/or repeated key from the candidate controller over the first communication pathway, the one or more offboard controllers can determine the candidate operator to be a confirmed operator. Determining the candidate operator to be a confirmed operator can include identifying, authenticating, and/or authorizing the candidate operator as a confirmed operator. The one or more offboard controllers can open a communication session between the confirmed operator and the one or more vehicles, permitting the confirmed operator to control the movements thereof. Accordingly, authenticating operators improves the security of vehicle networks by restricting access to confirmed operators. Restricting access to confirmed operators can avoid unauthorized and/or conflicting control of vehicles among operators and/or among entities associated with vehicle networks, thereby improving the safety of vehicle networks.

Figure 1:
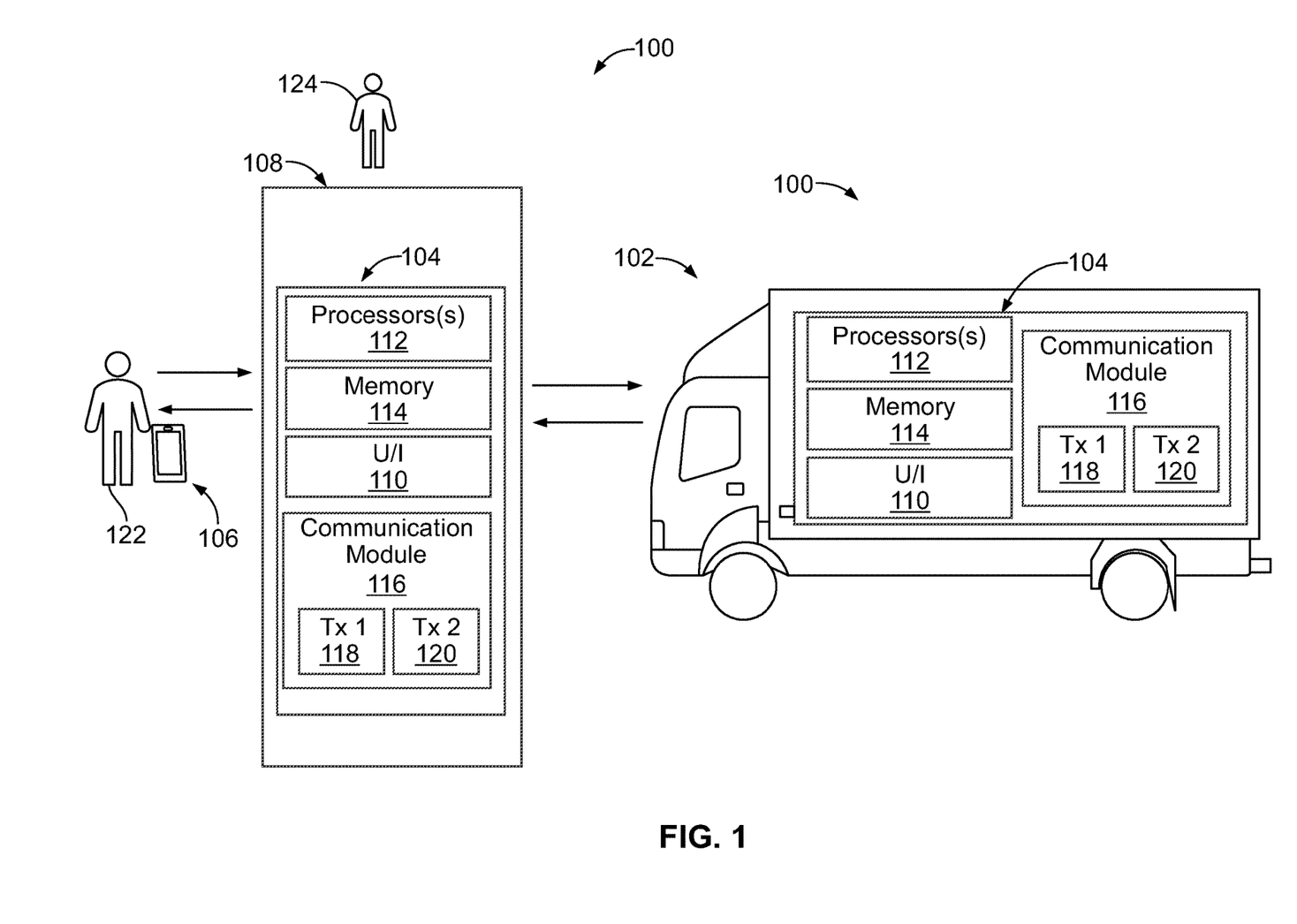
FIG. 1 illustrates an example of a system for authenticating an operator in accordance with one or more embodiments described herein.

FIG. 1 illustrates an example of a system for authenticating an operator in accordance with one or more embodiments described herein. The system is at least partially implemented in a controller 104 disposed onboard a vehicle 102 (an onboard controller) and at least partially implemented in a controller 108 disposed offboard the vehicle (an offboard controller, such as in a back office or dispatch agency associated with one or more vehicle networks). The offboard controller 108 may be associated with a dispatcher 124. A controller includes hardware circuitry that includes and/or is operably coupled with one or more processors. Optionally, the system can be at least partially implemented in one or more nodes 106. A node 106 can be any device that is operable to create, send and/or receive data or other signals, as discussed further herein. Nodes 106 can be associated with an operator 122 (e.g., a candidate operator or a current operator) and/or a physical location associated with the operator 122. The term "vehicle" shall refer to any system for transporting or carrying one or more passengers and/or cargo. Types of vehicles 102 include automobiles, trucks, buses, rail vehicles (e.g., one or more locomotives and/or one or more rail cars), agricultural vehicles, mining vehicles, aircraft, industrial vehicles, marine vessels, automated and semi-automated vehicles, autonomous and semi-autonomous vehicles, and the like. The vehicle 102 can be connected with one or more other vehicles logically and/or mechanically, such as one or more locomotives connected with one or more rail cars, to form at least part of a consist. The term "consist," or "vehicle consist," refers to two or more vehicles or items of mobile equipment that are mechanically or logically coupled to each other. By logically coupled, the plural items of mobile equipment can communicate with each other (e.g., by wireless command) to coordinate movements so the mobile equipment moves together (e.g., as a convoy). An Ethernet over multiple unit (eMU) system may include, for example, a communication system for use transmitting data from one vehicle to another in consist (e.g., an Ethernet network over which data is communicated between two or more vehicles). In one example of a consist, the vehicle 102 can be capable of propulsion to pull and/or push additional vehicles or other mobile equipment, either capable or incapable of propulsion, carrying passengers and/or cargo (e.g., a train or other system of vehicles).

The onboard controller 104 can control operation of the vehicle 102. Among other things, the onboard controller 104 can control operation of a propulsion system (not shown) onboard the vehicle 102. Optionally, in the case of a consist where the vehicle 102 is logically and/or mechanically connected with other vehicles, the onboard controller 104 can be configured to generate control signals for and/or receive control signals from the other vehicles. The onboard controller 104 includes and/or is configured to be operably coupled with one or more user interfaces 110, one or more processors 112, one or more non-transitive storage devices 114 (or memory), one or more communications modules 116, one or more sensors (not shown), and, optionally, one or more nodes 106. The one or more processors 112 can include and/or represent one or more hardware circuits or circuitry that includes and/or is operably coupled with one or more computer processors (e.g., microprocessors) or other electronic logic-based devices.

The offboard controller 108 and, optionally, one or more nodes 106, can also include and/or be configured to be operably coupled with one or more user interfaces 110, one or more processors 112, one or more non-transitive storage devices 114 (or memory), one or more communications modules 116, one or more sensors (not shown), and, optionally, one or more nodes 106.

In accordance with one or more embodiments described herein, the onboard controller 104 and/or the offboard controller 108 can implement a control system 100 (e.g., a system including positive and/or negative control functionality). The onboard controller 104 and/or the offboard controller 108 can include a user interface 110. The user interface 110 can include a display and/or operational controls. In one example, the onboard controller 104 can be positioned in a cabin of a vehicle 102 (e.g., in an automobile, in a lead vehicle of a consist, or the like) and can monitor the location and movement of the vehicle 102 within a vehicle network. For example, the control system 100 can enforce travel restrictions including movement authorities (e.g., generated by one or more offboard controllers 108) that prevent unwarranted movement of the vehicle 102 (e.g., by unauthorized controllers and/or into certain route segments). Additionally or alternatively, the control system 100 can allow the vehicle 102 to enter certain route segments unless or until a signal from an off-board controller 108 tells the vehicle 102 to not enter into the segment. In this way, vehicle security can be increased and vehicle collisions, over speed accidents, incursions into work zones, and/or travel through improperly managed junctions among pathways can be reduced or prevented. As an example, the control system 100 may provide commands to the propulsion system of the vehicle 102 and, optionally, to propulsion systems of one or more other vehicles, to slow or stop the vehicle 102 (or consist) in order to comply with a speed restriction or a movement authority. It will be appreciated that the control system 100 may also implement, in addition to or in lieu of positive controls, one or more of negative controls, open loop controls, closed loop controls, or the like without departing from the scope of the inventive subject matter discussed herein.

The processors 112, responsive to instructions stored in the memory 114, perform operations to control the system to, among other operations, authenticate an operator 122 and/or control movement of the vehicle 102. The one or more offboard controllers 108 can be configured to receive requests to assume control of the vehicle 102 generated by candidate operators over a first communication pathway, obtain a key from the onboard controller 104 associated with the vehicle 102, communicate the key to candidate operators over a second communication pathway different from the first communication pathway, and determine candidate operators to be confirmed operators based partially on obtaining the key from candidate operators via the first communication pathway. The first communication pathway and the second communication pathway can include one or more of different wireless networks, different communication media (e.g., EM waves, conductive pathways, PLCs, etc.) or different communication protocols.

A key can be one or more of an encrypted key, a unique key, a cryptographic key, a private portion of a cryptographic key-pair associated with a registered identity, and the like, as described further below. The one or more offboard controllers 108 can be configured to control movement of at least the vehicle 102 and one or more other vehicles. The one or more onboard controllers 104 can be configured to receive a request for a key, generate the key, communicate the key to one or more offboard controllers 108 associated with the vehicle network, and determine candidate operators to be confirmed operators based at least in part on obtaining confirmation signals from the offboard controller 108 indicating candidate operators to be confirmed operators prior to opening a secure communication channel with the candidate operators. The secure communication channel can be any type of communication channel designed so that only authorized parties can exchange data. The one or more onboard controllers 104 and/or the one or more nodes 106 can be configured to, among other things, receive the key over the second communication pathway and/or communicate the key to the candidate operator 122.

The communications module 116 can provide one or more types of transceivers for communicating, among other things, keys over different communication pathways in accordance with one or more embodiments described herein. The different communication pathways can include one or more of different bands, different protocols, different communications networks, or the like. The one or more processors 112 can select one or more different communication pathways for communicating with operators 122 and/or vehicles 102. In accordance with one or more embodiments herein, the one or more processors 112 can select a first communication pathway for communicating with the vehicle and for receiving a key from a candidate operator and a second communication pathway for communicating the key to the candidate operator. In accordance with one or more embodiments, the first communication pathway can include any type of communications pathway suitable for establishing a secure communication session between a confirmed operator and the vehicle. The second communication pathway can include one or more of a different band than the band of the first communication pathway (e.g., different bands on a spectrum of bands, wireless and wired bands, intranet and internet bands, etc.), a different protocol than the protocol of the first communication pathway (e.g., Ethernet, controller area network bus, etc.), a different communications network than the first communication pathway (e.g., far field radio, near field radio, cellular, satellite, etc.), or the like. It will be appreciated that additional transceivers for different communication pathways may be provided or that one or more of the communications pathways discussed above may be omitted without departing from the scope of the inventive subject matter discussed herein.

In accordance with one or more embodiments described herein, nodes 106 may be one or more of onboard the vehicle 102, offboard and/or remote from the vehicle 102, accessible by a candidate operator 122, associated with a location of the candidate operator 122, viewable by the candidate operator 122, or the like. A node 106 can be any device that is, among other things, operable to receive and/or communicate data or other signals indicative of a key. For example, the nodes 106 can be one or more of a mobile communication device, a hardwired or wireless unit including sensors and/or a user interface configured to be implemented in a location associated with one or more candidate operators 122 (e.g., onboard the vehicle 102, at a centralized control center, etc.), a magnetic and/or radio frequency identification (RFID) badge, a dongle (e.g., implemented as a key fob, a badge, etc.), the onboard controller 104, or the like. Additionally or alternatively, the node 106 can include and/or be coupled to one or more biometric sensors. Additionally or alternatively, one or more nodes 106 may form part of an operator authentication system implemented as part of and/or in conjunction with one or more of the onboard controller 104 and/or one or more offboard controllers 108.

The one or more nodes 106 and/or the onboard controller 104 associated with the vehicle 102 can be configured to receive and/or communicate a key to a candidate operator 122 via a second communication channel different from the first communication channel. In accordance with one or more embodiments described herein, the key can be communicated to the controller 122 by the offboard controller 108 in response to a candidate operator-generated request to assume control of the vehicle 102 received at the offboard controller 108. For example, the candidate operator can access a user interface 110 associated with one or more of the onboard controller 104 and/or one or more nodes 106 and select a button and/or execute a function to view a key transmitted by the offboard controller 108. Additionally or alternatively, the key can be contained in an encrypted format (e.g., an encrypted email, text, protected-access view of an application, or other communication) and the node 106 can administer one or more challenges to authenticate the identity of the candidate operator 122 in order to display the key. The one or more challenges can include and/or involve one or more of authentication information (e.g., user name, unique identity number, password, answer to a challenge question, etc.), presentation of an authentication item (e.g., a secure flash drive, an RFID badge, a dongle, or other data carrier coded with a unique identity number or the like), presentation of biometric information collected via one or more biometric sensors (e.g., fingerprint, eye, facial recognition, etc.), presentation of private key portions of key-pairs associated with a registered identity, or the like. Additionally or alternatively, the candidate operator may access a user interface implemented on a node (e.g., a personal mobile communications device, etc.) to execute a function to view a key.

The one or more processors 112 can be configured to receive the key repeated by the candidate operator 122 over the first communication pathway via one or more nodes 106 and/or the onboard controller 104. Based on receiving the repeated key, the one or more processors 112 can determine whether the candidate operator is an authorized operator. Based on determining the candidate operator to be a confirmed operator, the one or more processors 112 can establish a secure communications session between the vehicle 102 and the candidate (now confirmed) operator 122, thereby allowing the confirmed operator to control movements of the vehicle. Based on failing to determine the candidate operator to be a confirmed operator (e.g., by receiving a different key, or by otherwise failed credentials), the one or more processors 112 can deny the candidate operator control of movement of the vehicle 102.

Optionally, in accordance with one or more embodiments herein, the one or more processors 112 can be further configured to open a secure communication channel between the vehicle 102 and the confirmed operator.

Optionally, in accordance with one or more embodiments herein, the second communication pathway can be associated with a type of communications network, a communication band, or a type of communication protocol that is different from the type of communications network, the communication band, or type of communication protocol associated with the first communication pathway.

Optionally, in accordance with one or more embodiments herein, the one or more processors 112 can be configured to determine the candidate operator to be the confirmed operator also based on one or more of an operator credential, a vehicle operation schedule, an operator authority level, or biometric identification information.

Optionally, in accordance with one or more embodiments herein, the one or more processors 112 can be configured to determine the candidate operator to be the confirmed operator also based on a current operator of the vehicle 102 confirming relinquishing control of the vehicle 102.

Optionally, in accordance with one or more embodiments herein, the one or more processors 112 can be further configured to obtain a second key from the onboard controller 104, communicate the second key to the current operator via the second communication pathway, and determine the current operator to be an outgoing operator based at least in part on obtaining the second key from the current operator via the first communication pathway.

Optionally, in accordance with one or more embodiments herein, the one or more processors 112 can be further configured to determine the candidate operator to be the confirmed operator also based on determining the candidate operator to be the only possible operator of the vehicle 102.

Figure 2:
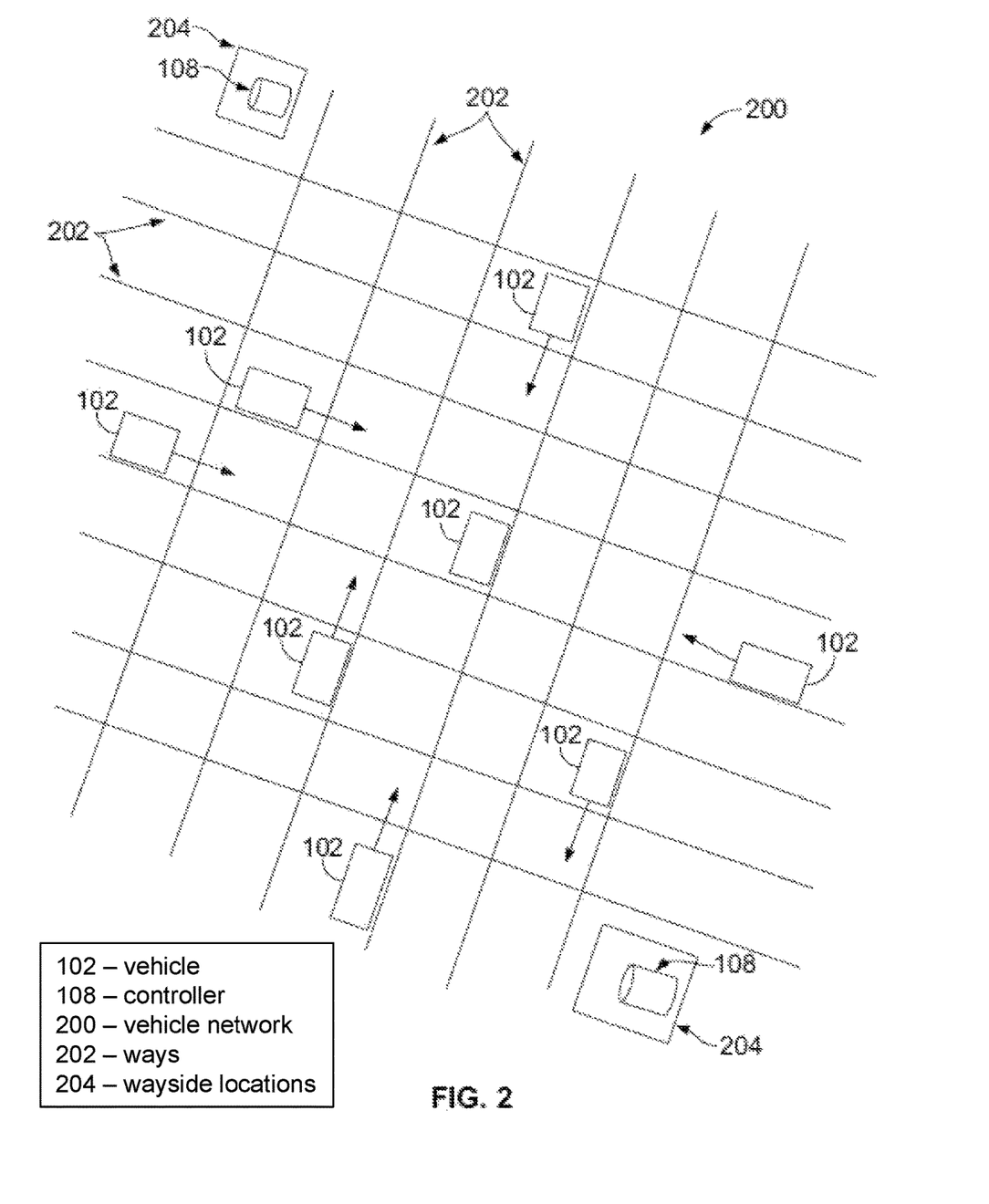
FIG. 2 illustrates an example vehicle network for implementing an operator authentication system in accordance with one or more embodiments described herein.

FIG. 2 illustrates an example vehicle network for implementing an operator authentication system in accordance with one or more embodiments described herein. The terms "vehicle control network" and "vehicle network" shall mean a control network implemented among one or more vehicles 102 and/or one or more offboard control systems 108. Vehicle networks 200 are capable of communicating and/or implementing one or more of positive controls, negative controls, open loop controls, closed loop controls, or the like. Vehicle networks 200 may be used to manage one or more of vehicles, types of vehicles, modes of transport, traffic on ways and/or paths, and the like associated with the vehicle network 200. Vehicle networks 200 may manage ways 202 designed for one or more types of vehicles 102. Additionally or alternatively, vehicle networks 200 may manage the same or different types of vehicles 102. Vehicle networks 200 may exist in a static or dynamic geographic domain or among a select vehicle population. Vehicle control networks 200 may also be formed on an ad-hoc basis between a plurality of vehicles 102. Operators 122 associated with vehicle networks 200 may control one, a portion of, or all of the vehicles associated with a given vehicle network 200. Additionally or alternatively, operators 122 associated with vehicle networks 200 may control one, a portion of, or all of aspects of the vehicles associated with a given vehicle network 200. Additionally or alternatively, operators 122 associated with vehicle networks 200 may include one or more autonomous controllers, AI controllers, or human controllers. Non-limiting examples of vehicle networks 200 include vehicular ad hoc networks, positive vehicle control networks, negative vehicle control networks, closed loop vehicle control networks, open loop vehicle control networks, hybrid vehicle control networks, autonomous vehicle control networks, and the like.

The vehicle network 200 includes a plurality of ways 202 that can be designed for one or more types of vehicles 102. The terms "path" and "way" shall mean any road or other way on land, air, or water, including all public and private roads, tracks, and routes, regardless of any entity responsible for maintenance of the way (e.g., a private entity, a state entity, a provincial entity, a county entity, an international entity, or the like). The one or more processors 112 can, responsive to receiving one or more candidate operator-generated requests to assume control of one or more vehicles 102, request keys from one or more vehicles 102 in the vehicle network 200 and one or more offboard control systems 108 configured to control movement of at least the first vehicle and the one or more second vehicles. In accordance with one or more embodiments herein, one or more of the ways 202, one or more of the vehicles 102, one or more of the controllers 122, or one or more of the wayside locations 204 may be subject to the control of (e.g., owned by, operated by, governed by, etc.) different entities. For example, a first wayside location may be owned by a first entity and a second wayside location may be owned by a second entity. Additionally or alternatively, all or a portion of the ways 202 can be subject to the control of a first entity, all or a portion of the wayside locations 204 can be subject to the control of a second entity different from the first entity, and all or a portion of the vehicles 102 can be subject to control of a third entity different from one or more of the first entity and the second entity.

The one or more offboard control systems 108 may be implemented remotely (e.g., a remote office, a virtual office, or one or more remote servers or the like) or at one or more wayside locations 204 in the vehicle network 200. Wayside locations 204 may embody different devices located along ways 202. Non-limiting examples of devices implemented at wayside locations 204 include signaling devices, switching devices, communication devices, etc. The wayside locations 204 can include offboard control systems 108. In one example, the offboard control systems 108 authenticate operators and/or provide travel information to the vehicles 102 operating in the vehicle network 200. Wayside locations 204 can also include wireless access points that enable appropriately equipped vehicles 102 in range to connect to one or more radio and/or wireless networks associated with the vehicle network 200. The onboard controller 104, one or more nodes 106, or one or more communication modules 116 onboard the vehicles 102 of the vehicle network can dynamically establish network sessions with available radio and/or wireless networks through such devices implemented at wayside locations 204 to relay data communication between vehicles 102 of the vehicle network 200 and/or one or more offboard control systems 208 associated with the vehicle network 200.

In accordance with one or more embodiments herein, a candidate operator can communicate a request to assume control of a vehicle 102 via a first communication pathway. The request to assume control of the vehicle 102 can be generated by a candidate operator accessing the user interface 110 of the onboard controller 104 and/or the node 106. The candidate operator can select an operator authentication function at the user interface 110 operably coupled to the onboard controller 104 and/or the node 106. For example, the candidate operator can access a user interface 110 associated with the onboard controller 104 and/or the node 106 (e.g., a personal mobile communications device, a wired terminal, or a wireless terminal, etc.).

Upon receiving a candidate operator-generated request to assume control of a vehicle 102 over a first communication pathway, the one or more processors 112 of the offboard controller 108 can obtain a key from the onboard controller 104 of the vehicle 102. The key can be generated by a key generator implemented in and/or configured to be operably coupled to the onboard controller 104. They key generator can be configured to generate random and/or secure keys. Additionally or alternatively, the key can be encrypted and/or retrieved from the storage medium 114 by the one or more processors 112 of the onboard controller 104. The onboard controller 104 can communicate the key to one or more offboard controllers 108 via the first communication pathway. The one or more offboard controllers 108 can communicate the key to the candidate operator via a second communication pathway that is different from the first communication pathway.

Based on the one or more offboard controllers 108 communicating the key via the second communication pathway, the candidate operator can access a user interface 110 associated with one or more of the onboard controller 104 and/or one or more nodes 106 to view the key and communicate the key to one or more offboard controllers 108 via the first communication pathway or another communication pathway different from the second communication pathway. Additionally or alternatively, the candidate operator can execute a function (e.g., by selecting a button, etc.) to view a key transmitted by the offboard controller 108. The key can be communicated in an encrypted format (e.g., an encrypted email, text, protected-access view of an application, or other communication) and/or the onboard controller 104 or the node 106 can administer a challenge to authenticate the identity of the candidate operator 122 in order to display the key. The challenge can require the candidate operator to provide authentication information (e.g., user name, identity number, password, etc.), present an authentication item (e.g., a secure flash drive or other data carrier coded with a unique identity number or the like), present biometric information at one or more biometric sensors (e.g., fingerprint, eye, facial recognition, etc.), present a private key portion of a key-pair associated with a registered identity, or the like.

The candidate operator can communicate the key to one or more offboard controllers 108 using the first communication pathway. For example, the candidate operator can input and/or communicate the key by selecting one or more buttons and/or functions presented at the user interface 110 of the onboard controller 104 and/or the node 206 and execute a function to transmit the key to the offboard controller 108. Additionally or alternatively, the candidate operator can communicate the key to one or more offboard controllers 108 using a communication pathway that is different from and/or adjunct to the first communication pathway. For example, the candidate operator can place a phone call to a dispatcher 124 associated with the one or more offboard controllers 108 (e.g., an AI dispatcher, a live dispatcher, or an automated dispatcher) and communicate the key either verbally and/or by a series of coded and/or audible tones.

The one or more offboard controllers 108 can determine the candidate operator to be a confirmed operator based at least in part on obtaining the key from the candidate operator. The one or more offboard controllers 108 can identify, authenticate, and/or authorize a candidate operator as a confirmed operator at least in part by comparing the key communicated by the candidate operator with the key received from the onboard controller 104 of the vehicle 102. For example, the one or more offboard controllers 108 can determine whether the key communicated by the candidate operator is identical to the key received from the onboard controller 104. The one or more offboard controllers 108 can also identify, authenticate, and/or authorize a candidate operator as a confirmed operator based at least in part on one or more of an operator credential, a vehicle operation schedule, an operator authority level, or biometric identification information. For example, the one or more offboard controllers 108 can compare the identity of the candidate operator to a list of authorized operators and/or a schedule of authorized operators to verify that the candidate operator has the requisite permissions to control the vehicle 102 and/or is scheduled to control the vehicle 102 at the time of the request. Additionally or alternatively, the key communicated by the candidate operator can include a first key portion that can be combined with a second key portion to identify, authenticate, and/or authorize the candidate operator as a confirmed operator. For example, the first key portion can be a private key portion and the second key portion an be a public key portion. The first and second key portions can include one or more key-pairs that correspond to identity-related attributes associated with the candidate operator (e.g., operator credentials, biometric identification information, etc.), a vehicle operation schedule, an operator authority level, or the like.

Based on determining the candidate operator to be a confirmed operator, the one or more offboard controllers 108 can allow the confirmed operator to control movement of the vehicle 102. Additionally or alternatively, the one or more offboard controllers 108 can open a secure communication channel between the vehicle 102 and the confirmed operator. Opening a communication channel can include establishing a vehicle session between the vehicle 102 and the confirmed operator. During the vehicle communication session, the confirmed operator can control movement of one or more vehicles 102 or groups of vehicles 102 associated with the vehicle network 200.

Additionally or alternatively, the one or more offboard controllers 108 can determine the candidate operator to be a denied operator based at least in part on obtaining a different key than the key from the candidate operator necessary to identify, authenticate, and/or authorize the candidate operator. Based on determining that the key communicated by the candidate operator does not match the key received from the onboard controller 104, the one or more offboard controllers 108 can determine the candidate operator to be a denied operator and deny the candidate operator the ability to control movement of the vehicle 102.

Figure 3:
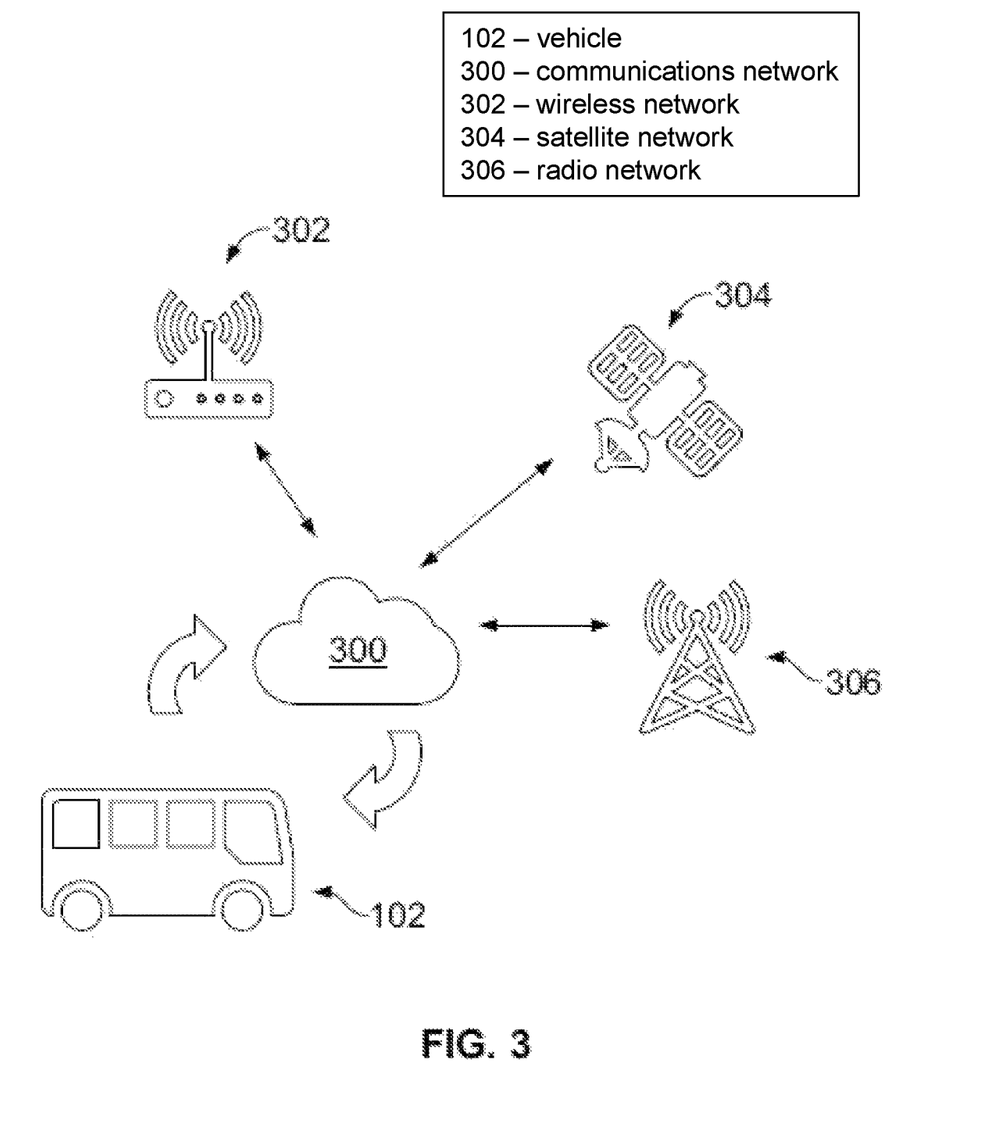
FIG. 3 illustrates an example of a communications network for implementing an operator authentication system in accordance with one or more embodiments described herein.

FIG. 3 illustrates a block diagram of an example of a communications network for authenticating an operator in accordance with one or more embodiments described herein. The communications network 300 can include one or more of a wireless network 302, a satellite network 304, or a radio network 306. The onboard controller(s) and the offboard controller(s) on the vehicle network 200 can include, as part of the communication module 116, one or more of a wireless transceiver, a satellite transceiver, or a radio transceiver. The wireless transceivers, satellite transceivers, or radio transceivers may be implemented as part of one or more of the onboard controller 104, the offboard controller 108, and/or one or more nodes 106 configured to be coupled to the onboard controller 104 and/or the offboard controller 108.

The wireless network 302 can be provided by wireless access points implemented in the vehicle network 200. As the vehicles 102 travel through different travel zones, the wireless network device 408 onboard the vehicles 102 can detect different wireless network access points provided by wayside devices 210 or other communication devices along the ways 202 of the vehicle network 200. In one example, a single wireless network 302 covers a travel territory, and different wayside devices 210 provide access points to the wireless network 302. Non-limiting examples of protocols that wireless network devices follow to connect to the wireless network 402 include IEEE 802.11, Wi-Max, Wi-Fi, and the like. In one example, the wireless network communications operate around the 220 MHz frequency band. By relaying vehicle data communications through the wireless network 402, communications, including operator authentication communications, can be made more reliable, especially in conditions where direct radio communication can be lost.

The satellite network 304 utilized by the vehicle network 200 can be provided by one or more satellites. The vehicles 102 can transmit and receive data communications relayed through one or more satellites via satellite transceivers implemented as part of the onboard controller 104, the offboard controller 108, one or more nodes 106. In one example, a satellite transceiver can receive vehicle location information from a third-party global position system to determine the location of the respective vehicle 102. The vehicles 102 can communicate directly with one or more offboard control systems 208 associated with the vehicle network 200.

The radio frequency (RF) network 306 utilized by the vehicle network 200 can be provided by one or more RF communications towers and RF repeaters. The vehicles 102 can transmit and receive RF data communications relayed through one or more RF communications networks via radio transceivers operably coupled to the onboard controller 104, the offboard controller 108, and one or more nodes 106. In some embodiments, an RF transceiver includes a cellular radio transceiver (e.g., cellular telephone module) that enables a cellular communication pathway. In one example, the cellular radio transceiver communicates with cellular telephony towers located proximate to the ways 202 of the vehicle network 200. For example, radio transceivers enable data communications between the vehicles 102, the nodes 106, and the offboard controller 108 through a third-party cellular provider. Additionally or alternatively, radio transceivers enable data communication between the vehicles 102 and a remote office associated with the vehicle network 200 and/or the one or more offboard control systems 208 through a third-party cellular provider.

Figure 4:
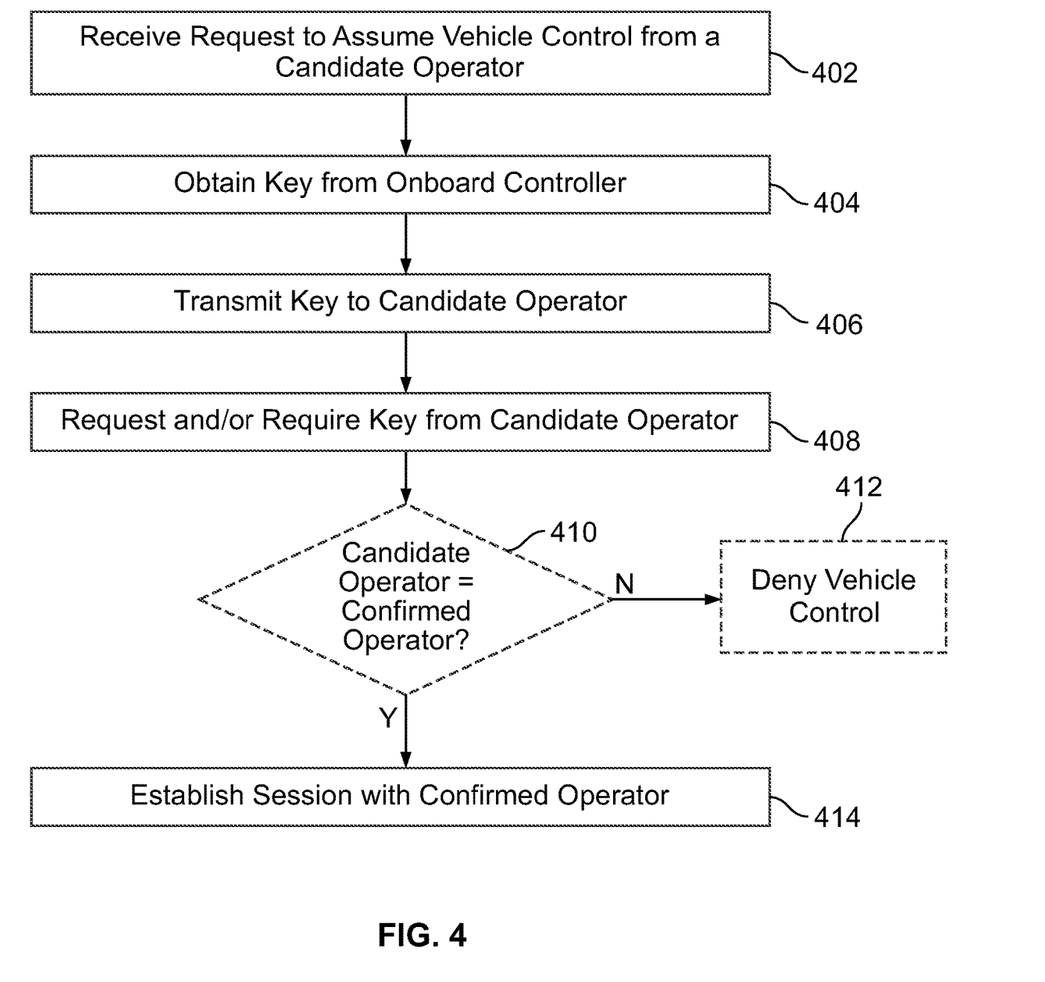
FIG. 4 illustrates a process for authenticating an operator in accordance with one or more embodiments described herein.

FIG. 4 illustrates an example process for authenticating an operator in accordance with one or more embodiments described herein. The operations of FIG. 4 are carried out by one or more processors 112 in response to execution of program instructions, such as in applications stored in the storage medium 114 (or memory) implemented on one or more of an onboard controller 104, one or more offboard controllers 108, or one or more nodes 106. Optionally, all or a portion of the operations of FIG. 4 may be carried out without program instructions, such as in a key generator implemented in or operably coupled to the onboard controller 104 of the vehicle 102 that has the corresponding operations implemented in silicon gates and other hardware. It should be recognized that while the operations of method 400 are described in a somewhat serial manner, one or more of the operations of method 400 may be continuous and/or performed in parallel with one another and/or other operations of the one or more nodes 106, the one or more offboard controllers 108, and/or the onboard controller 104.

At 402, the one or more processors 112 receive a request to assume control of a vehicle generated by a candidate operator via a first communication pathway. The first communication pathway can include any type of communications pathway suitable for establishing a secure communication session between a confirmed operator and the vehicle. The request to assume control of the vehicle 102 can be generated based on the candidate operator accessing the user interface 110 of the onboard controller 104 and/or the node 106. The candidate operator can execute an operator authentication function at the user interface 110 operably coupled to the onboard controller 104 and/or the node 106. For example, the candidate operator can access a user interface 110 coupled to the onboard controller 104 (e.g., at a terminal) and/or the node 106 (e.g., a personal mobile communications device, a wired terminal, or a wireless terminal, etc.) and select a button to execute the operator authentication function to communicate the request to assume control of the vehicle 102 to the one or more offboard controllers 108. Based on the one or more processors 112 receiving the request to assume control of the vehicle 102, the process continues.

At 404, the one or more processors 112 obtain a key from an onboard controller 104 of the vehicle 102. The one or more processors 112 can obtain the key from the onboard controller 104 by communicating a request to and receiving the key from the onboard controller 104 over the first communication pathway. The key can be one or more of an encrypted key, a unique key, a cryptographic key, a private portion of a cryptographic key-pair associated with a registered identity, and the like as discussed further below. The key can include a plurality of one or more of letters, numbers, or symbols. The key can be generated by a key generator implemented in and/or configured to be operably coupled to the onboard controller 104. Optionally, the key can be randomly generated by the key generator. Additionally or alternatively, the key can be encrypted and/or retrieved from the storage medium 114 by the one or more processors 112 of the onboard controller 104. Additionally or alternatively, the key can include a first key portion that can be combined with a second key portion accessible by the one or more offboard controllers 108. Additionally or alternatively, the onboard controller 104 can communicate the key to one or more offboard controllers 108 via a communication pathway different from the first and second communication pathways.

At 406, the one or more processors 112 communicate the key to the candidate operator via a second communication pathway that is different from the first communication pathway. The one or more processors 112 can communicate they key to the candidate operator at a node 106 accessible by the candidate operator. A node 106 can be any device that is, among other things, operable to receive and/or communicate data or other signals indicative of a key. The node 106 can be onboard the vehicle 102, offboard and/or remote from the vehicle 102, accessible by a candidate operator 122, associated with a location of the candidate operator 122, viewable by the candidate operator 122, or the like. Examples of nodes 106 include mobile communications devices (e.g., smartphones, pagers, etc.), magnetic and/or radio frequency identification (RFID) badges, dongles (e.g., implemented as a key fob or the like), the onboard controller 104, or other hardwired or wireless units including sensors and/or a user interface 110 configured to be implemented in a location associated with one or more candidate operators (e.g., at a centralized control center or the like). The second communication pathway can include one or more of a different band than the band of the first communication pathway (e.g., different bands on a spectrum of bands, wireless and wired bands, intranet and internet bands, etc.), a different protocol than the protocol of the first communication pathway (e.g., Ethernet, controller area network bus, etc.), a different communications network than the first communication pathway (e.g., far field radio, near field radio, cellular, satellite, etc.), or the like. The candidate operator can access a user interface 110 associated with the node 106 and execute a function (e.g., select a button) to access the key transmitted by the offboard controller 108. Additionally or alternatively, the key can be contained in an encrypted format (e.g., an encrypted email, text, protected-access view of an application, or other communication) and/or the node 106 can administer one or more challenges to authenticate the identity of the candidate operator 122 in order to allow the candidate operator to access the key. The one or more challenges can include, for example and without limitation, presenting authentication information unique to the candidate operator, presenting an authentication item (e.g., an RFID badge, a dongle, etc.), presentation of biometric information to one or more biometric sensors integral with and/or operably coupled to the node 106, presentation of a first key portion of a key pair (e.g., a key pair including a private key portion and a public key portion associated with a registered identity), or the like.

At 408, the one or more processors 112 request and/or require the candidate operator to communicate the key to the one or more processors 112 over the first communication path. The candidate operator can communicate the key by verbally repeating and/or manually inputting the key into a field of a user interface 110 of the node 106 and/or the onboard controller 104. Additionally or alternatively, the candidate operator can communicate the key over any communication channel different than the second communication channel. For example, the candidate operator can place a phone call to and verbally repeat or input the key to a live, automated, and or AI dispatcher 124 associated with one or more offboard controllers 108 and/or current controller associated with the onboard controller 104. Additionally or alternatively, the candidate operator can execute a function to cause the key delivered via the second communication pathway to be communicated over the first communication pathway to the one or more offboard controllers 108.

At 410, the one or more processors 112 determine whether the candidate operator is a confirmed operator based at least in part on obtaining the key from the candidate operator via the first communication pathway. Determining the candidate operator to be a confirmed operator can include identifying, authenticating, and/or authorizing the candidate operator as a confirmed operator. The one or more offboard controllers 108 can identify, authenticate, and/or authorize a candidate operator as a confirmed operator at least in part by comparing the key communicated by the candidate operator with the key received from the onboard controller 104 of the vehicle 102 to determine if the received keys match. The one or more offboard controllers 108 can also identify, authenticate, and/or authorize a candidate operator as a confirmed operator based on one or more of an operator credential, a vehicle operation schedule, an operator authority level, or biometric identification information. For example, the one or more offboard controllers 108 can compare the identity of the candidate operator to a list of authorized operators and/or a schedule of authorized operators to verify that the candidate operator has the requisite permissions to control the vehicle 102 and/or is scheduled to control the vehicle 102 at the time of the request. Additionally or alternatively, the key communicated by the candidate operator can include a first key portion that can be combined with a second key portion to identify, authenticate, and/or authorize the candidate operator as a confirmed operator. For example, the first key portion can be a private key portion and the second key portion can be a public key portion of a registered identity. The first and second key portions can include one or more identity-related attributes associated with the candidate operator (e.g., operator credentials, biometric identification information, vehicle operation schedules, an operator authority level, etc.), the like. Based on failing to determine the candidate operator to be a confirmed operator, flow branches to 412. Based on determining the candidate operator to be a confirmed operator, flow branches to 414.

At 412, the one or more processors 112 deny the candidate operator control of the vehicle 102. The process can determine the candidate operator to be a denied operator based at least in part on obtaining a different key than the key from the candidate operator necessary to identify, authenticate, and/or authorize the candidate operator. Based on determining that the key communicated by the candidate operator does not correspond to the key received from the onboard controller 104, process can determine the candidate operator to be a denied operator and deny the candidate operator the ability to control movement of the vehicle 102, thereby ending and/or resetting the process.

At 414, the one or more processors 112 open a communication channel between the vehicle and the confirmed operator. Opening a communication channel between the vehicle 102 and the confirmed operator includes permitting the confirmed operator to control movement of the vehicle 102 and, optionally, additional vehicles associated with the vehicle network 200. The communication channel can be a secure communication channel. Opening a communication channel can include establishing a vehicle session between one or more vehicles 102 and the confirmed operator. During the vehicle communication session, the confirmed operator can control movement of one or more vehicles 102 or groups of vehicles 102 associated with the vehicle network 200. Accordingly, operator authentication is provided to prevent unauthorized and/or conflicting control of vehicles on a vehicle network.

Figure 5:
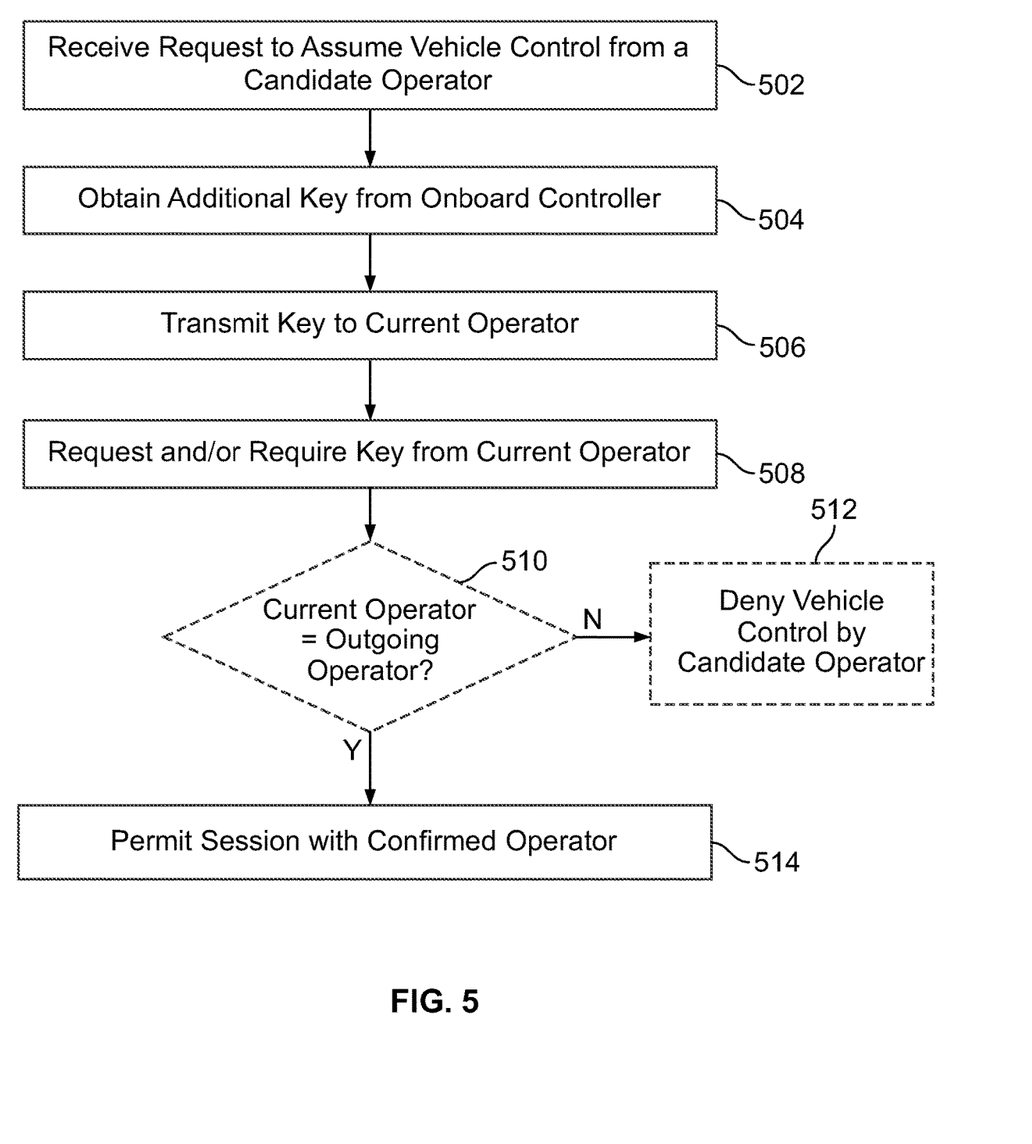
FIG. 5 illustrates a process for confirming an outgoing operator in accordance with one or more embodiments described herein.

FIG. 5 illustrates a process for confirming an outgoing operator in accordance with one or more embodiments herein. The operations of FIG. 5 are carried out by one or more processors 112 in response to execution of program instructions, such as in applications stored in the storage medium 114 (or memory) implemented on one or more of an onboard controller 104, one or more offboard controllers 108, or one or more nodes 106. Optionally, all or a portion of the operations of FIG. 5 may be carried out without program instructions, such as in a key generator implemented in or operably coupled to the onboard controller 104 of the vehicle 102 that has the corresponding operations implemented in silicon gates and other hardware. It should be recognized that while the operations of method 500 are described in a somewhat serial manner, one or more of the operations of method 500 may be continuous and/or performed in parallel with one another, the operations of FIG. 4, and/or other operations of the one or more nodes 106, the one or more offboard controllers 108, and/or the onboard controller 104.

At 502, the one or more processors 112 receive a request to assume control of a vehicle generated by a candidate operator via a first communication pathway as described in operation 402 of method 400.

At 504, the one or more processors 112 obtain an additional or second key from an onboard controller 104 of the vehicle 102 as described in operation 404 of method 400.

At 506, the one or more processors 112 communicate the key to a current operator via a second communication pathway that is different from the first communication pathway as described in operation 506 of method 400. The current operator may be one or more of an autonomous operator and/or an AI operator, while the candidate operator may be a human operator. Additionally or alternatively, the current operator may be a human operator and the candidate operator may be one or more of an autonomous operator and/or an AI operator. Additionally or alternatively, both the current operator and the candidate operator may be a human operator or one or more of an autonomous operator and/or an AI operator.

At 508, the one or more processors 112 request and/or require the current operator to communicate the key to the one or more processors 112 over the first communication pathway as described in operation 408 of method 400.

At 510, the one or more processors 112 determine whether the current operator is an outgoing operator based at least in part on obtaining the key from the current operator via the first communication pathway as described in operation 410 of method 400. Determining the current operator to be an outgoing operator can include identifying, authenticating, and/or authorizing the current operator as an outgoing operator. Determining the current operator to be an outgoing operator can be part of or precedent to determining the candidate operator to be a confirmed operator in operation 410 of method 400. Based on failing to determine the current operator is an outgoing operator, flow moves to 512 and the process denies control of movement of the vehicle by the candidate operator. Based on determining that the current operator is an outgoing operator, flow moves to 514 and the process permits establishment of a communication session between the confirmed operator (if the candidate operator is determined to be a confirmed operator at operation 410 of method 400).

Optionally, in accordance with one or more embodiments herein, the methods described herein can include determining the candidate operator to be a denied operator based at least in part on obtaining a different key than the key from the candidate operator via the first communication pathway.

Optionally, in accordance with one or more embodiments herein, the first communication pathway can operate in a first band and the second communication pathway can operate in a second band that is different from the first band.

Optionally, in accordance with one or more embodiments herein, the first communication pathway can be associated with a first type of communications network or a first type of communication protocol and the second communication pathway can be associated with a second type of communications network or a second type of communication protocol.

Optionally, in accordance with one or more embodiments herein, the key can be communicated to an onboard location associated with the candidate operator.

Optionally, in accordance with one or more embodiments herein, the key can be communicated to an offboard location associated with the candidate operator.

Optionally, in accordance with one or more embodiments herein, the methods described herein can include determining the candidate operator to be the confirmed operator is based at least in part on one or more of an operator credential, a vehicle operation schedule, an operator authority level, and biometric identification information.

Optionally, in accordance with one or more embodiments herein, the key can be a first key, and the methods described herein can include obtaining a different, second key from the onboard controller, communicating the second key to a current operator of the vehicle via the second communication pathway, determining the current operator to be an outgoing operator based at least in part on obtaining the second key from the current operator via the first communication pathway; and determining the candidate operator to be the confirmed operator also based on determining the current operator to be the outgoing operator.

Figure 6:
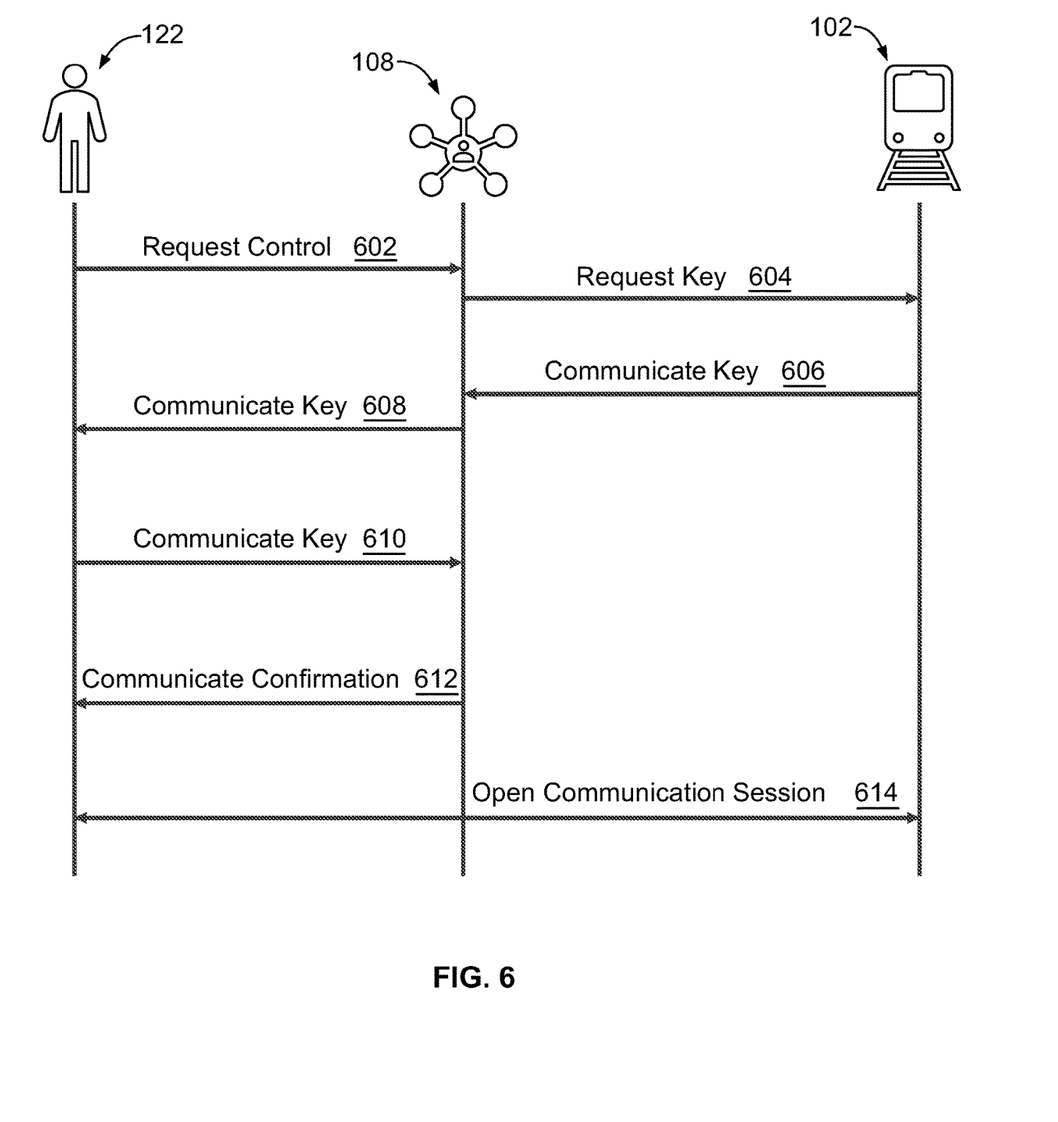
FIG. 6 illustrates a collection of communications for authenticating an operator in accordance with one or more embodiments described herein.

FIG. 6 illustrates a collection of communications for authenticating an operator in accordance with one or more embodiments described herein. At 602, a candidate operator communicates a request to assume control of one or more vehicles 102 over a first communication pathway to one or more offboard controllers 108. At 604, based on receiving the candidate-operator generated request to assume control of the one or more vehicles 102, the offboard controller 108 transmits a request to obtain a key from the onboard controller 104 of at least one of the one or more vehicles 102. At 606, based on receiving the request to obtain a key, the onboard controller 104 communicates the key to the one or more offboard controllers 108. The key can be generated by a key generator implemented in and/or configured to be operably coupled to the onboard controller 104. Additionally or alternatively, the key can be encrypted and/or retrieved from the storage medium 114 by the one or more processors 112 of the onboard controller 104. Additionally or alternatively, the key can be a private key portion of a registered identity associated with a vehicle 102 and the vehicle network 200. The registered identity can include a private key portion for the vehicle or a group of vehicles and/or a private key portion for an operator. The registered identity can also include a public key associated with the registered identity that is available via a repository accessible by one or more entities associated with the vehicle network. In one example, a registered identity can include a public key containing indicia of one or more authorized operators associated with one or more vehicles or groups of vehicles that can, optionally, be related to one or more scheduled communications sessions between operators and the one or more vehicles.

Based on receiving the key, at 608, the one or more offboard controllers 108 communicate the key to the candidate operator 122 over a second communication pathway that is different from the first communication pathway. At 608, the candidate operator 122 communicates the key back to the one or more offboard controllers 108 via the first communication pathway. For example, the candidate controller 122 can communicate a first private key portion received over the second communication pathway back to the one or more offboard controllers 108 via the first communication pathway. The first private key portion can represent a private key portion associated with at least the vehicle 102 and/or the group of vehicles 102. Additionally or alternatively, the candidate operator can also communicate a second private key portion associated with the identity of the candidate operator 122. The one or more private key portions received by the one or more offboard controllers 108 can be used to identify, authenticate, and/or authorize the candidate operator 122 as a confirmed operator for the one or more vehicles 102 and, optionally, for one or more scheduled communication sessions. For example, the one or more private key portions can be used to decrypt the public key associated with the registered identity. At 612 and 614, based on determining the candidate operator 122 to be a confirmed operator, the one or more offboard controllers 108 can communicate confirmation to the confirmed operator and/or open a communication session between the confirmed operator and the one or more vehicles 102. Opening a communication session between the confirmed operator and the one or more vehicles can permit the confirmed operator to control movement of the one or more vehicles 102. Accordingly, authenticating operators improves the security of vehicle networks by restricting access to confirmed operators, thereby avoiding unauthorized and/or conflicting control of vehicles among operators and/or among entities associated with vehicle networks.

In an embodiment, a method (e.g., of controlling a vehicle system) includes receiving, at an offboard controller, a request to assume control of a vehicle generated by an electronic device of a candidate operator via a first communication pathway. The method further includes the offboard controller obtaining a key from an onboard controller of the vehicle, and communicating the key to the device via a second communication pathway that is different from the first communication pathway. The method also includes, with the offboard controller, determining the candidate operator to be a confirmed operator based at least in part on obtaining (e.g., receiving) the key from the device via the first communication pathway, and based also at least in part on receipt of one or more second, different authentication factors from the device (e.g., pre-established passwords, biometric data, etc.) Responsive to determining that the candidate operator is a confirmed operator, the method also includes the offboard controller coordinating establishment of a communication channel between the device and the vehicle, for the confirmed operator to control the vehicle. Before determining that the candidate operator is a confirmed operator, the method may further include the offboard controller and/or the vehicle preventing the vehicle from being controlled by the candidate operator (e.g., by the device of the candidate operator).

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", and "one or more of A or B" (where "A" and "B" represent claim elements), are used to encompass i) A, ii) B and/or iii) both A and B.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    receiving a request to assume control of a vehicle, the request received by an off-board controller that is off-board the vehicle, the request generated by a node device of a candidate operator and received by the off-board controller via a first communication pathway;
    obtaining a key at the off-board controller, the key obtained by the off-board controller from an onboard controller of the vehicle;
    communicating the key from the off-board controller to the node device of the candidate operator via a second communication pathway that is different from the first communication pathway;
    receiving the key or a copy of the key at the off-board controller from the node device of the candidate operator; and
    determining the candidate operator to be a confirmed operator using the off-board controller and based at least in part on receiving the key or the copy of the key at the off-board controller from the node device of the candidate operator via the first communication pathway.

2. The method of claim 1, further comprising, responsive to determining that the candidate operator is the confirmed operator, opening a communication channel between the vehicle and the node device of the confirmed operator.

3. The method of claim 1, wherein the first communication pathway is associated with a first communication protocol and the second communication pathway is associated with a second communication protocol that is different from the first communication protocol.

4. The method of claim 1, wherein the first communication pathway operates in a first band and the second communication pathway operates in a second band that is different from the first band.

5. The method of claim 1, wherein the first communication pathway is associated with a first type of communications network and the second communication pathway is associated with a second type of communications network that is different from the first type of communications network.

6. The method of claim 1, wherein the key is communicated from the off-board controller to the node device that is onboard the vehicle.

7. The method of claim 1, wherein the key is communicated from the off-board controller to the node device that is offboard the vehicle.

8. The method of claim 1, wherein determining the candidate operator to be the confirmed operator is based at least in part on a vehicle operation schedule.

9. The method of claim 1, wherein the key is a first key, the node device is a first node device, and wherein the method further comprises:
   obtaining a different, second key at the off-board controller from the onboard controller;
   communicating the second key from the off-board controller to a second node device of a current operator of the vehicle via the second communication pathway;
   determining the current operator to be an outgoing operator based at least in part on obtaining the second key from second node device of the current operator via the first communication pathway; and
   determining the candidate operator to be the confirmed operator also based on determining the current operator to be the outgoing operator.

10. A system, comprising:
   an off-board controller configured to be offboard a vehicle and to receive a request to assume control of the vehicle, the request generated by a node device of a candidate operator and received by the off-board controller via a first communication pathway, the off-board controller configured to obtain a key from an onboard controller of the vehicle, the off-board controller configured to communicate the key to the node device of the candidate operator via a second communication pathway that is different from the first communication pathway, the off-board controller configured to receive the key or a copy of the key from the node device of the candidate operator, the off-board controller configured to determine the candidate operator to be a confirmed operator based at least in part on receiving the key or the copy of the key from the node device of the candidate operator via the first communication pathway.

11. The system of claim 10, wherein the off-board controller is configured to open a secure communication channel between the vehicle and the node device of the confirmed operator responsive to the candidate operator being determined at the confirmed operator.

12. The system of claim 10, wherein the second communication pathway is associated with a type of communications network, a communication band, or a type of communication protocol that is different from the type of communications network, the communication band, or type of communication protocol associated with the first communication pathway.

13. The system of claim 10, wherein the off-board controller is configured to determine the candidate operator to be the confirmed operator also based on a vehicle operation schedule.

14. The system of claim 10, wherein the off-board controller is configured to determine the candidate operator to be the confirmed operator also based on a current operator of the vehicle confirming a relinquishment of control of the vehicle.

15. The system of claim 14, wherein the key is a first key, the node device is a first node device, and the off-board controller is further configured to obtain a second key from the onboard controller and communicate the second key to a second node device of the current operator via the second communication pathway, the off-board controller configured to determine the current operator to be an outgoing operator based at least in part on obtaining the second key from the second node device of the current operator via the first communication pathway.

16. The system of claim 10, wherein the off-board controller is further configured to determine the candidate operator to be the confirmed operator also based on determining the candidate operator to be an only possible operator of the vehicle.

17. The system of claim 10, wherein the vehicle comprises one or more of an automobile, a truck, a bus, a rail vehicle, an agricultural vehicle, a mining vehicle, an aircraft, an industrial vehicle, a marine vessel, an at least partially autonomous vehicle, or an at least partially automated vehicle.

* * * * *